United States Patent [19]

Prober et al.

[11] 3,942,937

[45] Mar. 9, 1976

[54] METHOD OF PROVIDING DURABLE, SLICK SLIDING SURFACES ON EXTRUSION FORMING APPARATUS, AND THE PRODUCT THEREOF

[75] Inventors: Maurice Prober, Fairfield; Joseph Edward Vostovich, Bridgeport, both of Conn.

[73] Assignee: General Electric Company, New York, N.Y.

[22] Filed: May 16, 1974

[21] Appl. No.: 470,398

[52] U.S. Cl. ............... 425/461; 264/169; 264/338; 425/113; 427/135; 427/355
[51] Int. Cl.² ...................... B28B 7/36; B05D 3/12
[58] Field of Search ............ 117/5.3, 132 BS, 64 R, 117/161; 425/113, DIG. 55, 461; 264/338, 39, 169; 427/355, 135

[56] References Cited
UNITED STATES PATENTS

| | | | |
|---|---|---|---|
| 1,733,006 | 10/1929 | Cook et al. | 427/355 |
| 1,900,313 | 3/1933 | Stratford | 427/355 |
| 1,900,313 | 3/1933 | Stratford | 117/64 R |
| 2,403,476 | 7/1946 | Berry et al. | 425/DIG. 55 |
| 2,515,697 | 7/1950 | Cresswell | 264/169 |
| 2,719,073 | 9/1955 | Olson | 264/169 |
| 2,863,172 | 12/1958 | Buteux et al. | 425/DIG. 55 |
| 2,983,570 | 5/1961 | Lux | 117/132 BS |
| 3,113,883 | 12/1963 | James | 117/64 R |
| 3,188,239 | 6/1965 | Kloppers | 264/39 X |
| 3,628,996 | 12/1971 | Weber | 117/132 BS |

*Primary Examiner*—Harry J. Gwinnell
*Attorney, Agent, or Firm*—Raymond G. Simkins; Philip L. Schlamp; Frank L. Neuhauser

[57] ABSTRACT

The provision of a durable, slick sliding surface on metal faces of plastic forming extrusion apparatus such as extruder nozzles and dies. The durable, slick sliding metal surface is provided by burnishing and heat treating a polysiloxane fluid on the face of the metal. The burnishing comprises vigorous rubbing of the polysiloxane fluid treated metal face with a material relatively softer than the metal face being treated, effectively over the entire surface treated.

12 Claims, 1 Drawing Figure

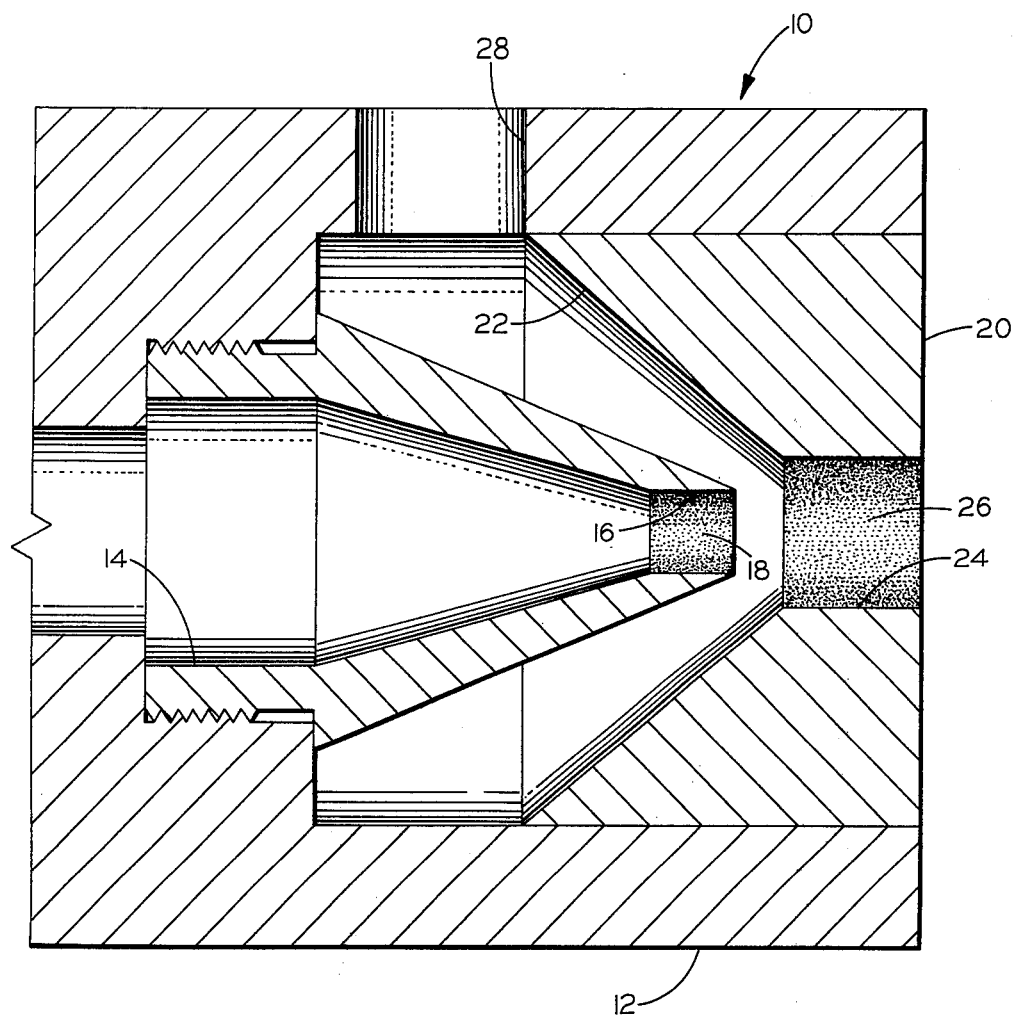

METHOD OF PROVIDING DURABLE, SLICK SLIDING SURFACES ON EXTRUSION FORMING APPARATUS, AND THE PRODUCT THEREOF

BACKGROUND OF THE INVENTION

In the manufacture of products comprising the continuous extrusion of thermoplastic materials, and particularly when sequentially extruding multilayered articles such as many common types of insulated electrical wires and cable, the heat-softened and often as yet semitacky thermoplastic materials passing under forming pressures in contact with the metal faces of guides, dies or other components of the extrusion apparatus, are frequently "pulled" or extended by their transient adherence to the metal surface. The "pulling" or extending of the plastic material due to its transient or intermittant adherence causes protrusions or marring of the surfaces of the plastic undergoing shaping, notwithstanding polishing and/or plating of the metal faces with relatively smooth impervious finishes such as chrome. This commonly encountered shortcoming in processes of continuously molding thermoplastic materials is especially troublesome in sequential or tandem and multiple head extrusion operations, such as shown in U.S. Pat. Nos. 3,569,610 and 3,646,248, and British Pat. No. 967,567 of Aug. 26, 1964, wherein two or more layers or plies of plastic materials are sequentially formed about a metallic conductor core in the manufacture of electrical wire or cable. These manufacturing operations typically comprise, for example, applying or forming under pressure a subsequent overlying layer of thermoplastic material directly upon a previously formed layer of yet thermoplastic material wherein the previously formed thermoplastic material is pulled through a close-fitting guide orifice of an extruder apparatus into an area under the extruding pressures of the subsequent thermoplastic material whereupon the superimposed composite of the previous layer and forming layer of both thermoplastic materials is then forced through a die.

Moreover, the deleterious effects of this occurrence is far more serious than simply producing irregular or rough surface conditions marring the exterior face of extruded products. For instance, the occurrence of transient adherence and pulling of an inner or underlying layer due to contact with an extruder guide orifice or with a previous extruder die in a sequential extrusion operation forming a multilayered product causes protrusions on the surface of the inner or underlying layer and in turn an irregular interface between the superimposed layers. This occurrence is especially detrimental in the manufacture of electrical wire and cable because the protuberances thus formed on the outer surface of an inner layer, and in turn at the interface between component layers of a composite insulation covering, are subject to dielectric strength failures.

SUMMARY OF THE INVENTION

This invention comprises a method of treating metal faces of continuous forming extruder apparatus, such as shaping die lands and guide orifices, over which thermoplastic materials move in sliding contact under pressure to provide thereon a durable, slick sliding surface which resists adherence by heat-softened and tacky thermoplastic materials, and the durable, slick-sliding and adhesion resisting metal surface product of the method.

The treatment of this invention comprises applying to the metal face a polysiloxane fluid, burnishing and then heating the metal face with the polysiloxane fluid thereon.

OBJECTS OF THE INVENTION

It is a primary object of this invention to provide a method of overcoming the occurrence of transient adherence of thermoplastic materials to metal faces of continuous extrusion forming apparatus while such materials are moving in sliding contact through the apparatus and thereby eliminate the formation of detrimental protrusions on the surface of the extruded material due to the pulling or extending effect of the intermittent temporary or transient adherence of the thermoplastic material to the metal faces.

A more specific object of this invention is to provide a simple and economical treatment for the metal faces of continuous extrusion forming apparatus to produce thereon a durable and longlasting slick sliding surface which effectively resists adherence by heat-softened and tacky thermoplastic materials, and the treated products thereof consisting of improved continuous extrusion forming apparatus.

BRIEF DESCRIPTION OF THE DRAWING

The drawing comprises a cross-sectional view of a typical extrusion forming head device embodying the present invention.

DESCRIPTION OF A PREFERRED EMBODIMENT

This invention is hereinafter described in relation to its principal field of application and utility, the sequential or tandem continuous extrusion manufacture of multiple layered curable thermoplastic coverings on electrical wire and cable. However, the invention applies in general to all continuous forming procedures and apparatus including the utilization of metal shaping means to continuously mold plastic materials while in a heat-softenable or thermoplastic state, and including curable or thermosetting plastic materials or compounds.

Many conventional insulated electrical wire or cable constructions comprise a composite of two or more layers composed of distinct thermoplastic compositions such as dielectric insulating bodies and semiconductive shielding bodies, and their manufacture includes the sequential or tandem extrusion of one body of thermoplastic material directly over a previously extruded body of thermoplastic body carried on the core of a metallic conductor. The drawing illustrates an extruder head generally of the type typically utilized in such a sequential or tandem continuous extrusion manufacturing operation of electrical cable, and wherein the problem resolved by this invention was the most serious because it caused or contributed to the failure of cable products in their designed performance.

Referring to the drawing, the partially illustrated extruder head 10, shown in cross section, comprises a housing 12, containing a guide tube 14 with a guide orifice 16 having a tubular land or face 18. A die member 20 is also positioned within the housing 10 downstream of the guide tube, having a conical tapered surface 22 leading to a die orifice 24, provided with a tubular land or face 26. The guide tube orifice 16 is concentrically aligned with die orifice 24. An inlet 28 is provided in the housing for entry of thermoplastic material moving through the extrusion forming apparatus.

In a typical operation for the manufacture of electrical cable with an insulating covering comprising multiple layers of distinct thermoset materials, a layer of curable thermoplastic material is continuously formed about a metal conductor core in a preceding extrusion operation whereupon it is continuously drawn through an extruder head such as illustrated in the drawing for the purpose of extrusion molding of another layer of curable thermoplastic material overlying that previously formed. For instance, the metal conductor carrying the layer of thermoplastic material from the preceding extrusion is continuously drawn through guide tube 14 and orifice 16 for alignment with the die orifice 24, and the diameters of the thermoplastic-covered conductor and the orifice 16 of guide tube 14 are guaged for close-fitting contact to provide accuracy in the alignment and to provide a seal to resist the extrusion pressure of the second thermoplastic material being forced in through inlet 28, and out through die 26 as it forms about the moving conductor and layer of the first thermoplastic material.

In such sequential or tandem extrusion operations, hot and thus soft and somewhat tacky thermoplastic materials moving under pressure in sliding contact over the metal faces such as the guide orifice 16 and die orifice 26 found in prior art apparatus are prone to intermittent temporary adhesion to such surfaces whereupon this transient adherence to the metal pulls upon the mass of the moving soft plastic material and thereby distorts its shaped configuration, extending it and forming protrusions. The presence of protrusions or undulations at the interface between layers or units of different electrical properties in high-voltage cable constructions which occur due to transient adherence of the previously extruded thermoplastic material to the guide tube, degrades the performance of the cables and hasten their failure. Thus the consequences of this phenomenon are far more serious in the electrical field than merely the appearances of an irregular surface.

The foregoing difficulties have been overcome by the method of this invention comprising applying polysiloxane fluid to the metal face of any critical areas of the extrusion forming apparatus, such as faces 18 and 26, preferably should be liberally applied so as to saturate the surface.

Burnishing of the metal face having thereon the polysiloxane fluid, or a water emulsion or solution thereof, can be achieved by a vigorous rubbing of the fluid-containing surface with a material relatively softer than the metal being treated, hard woods such as hickory or oak being suitable materials. The burnishing should effectively cover the entire surface to be treated.

Heating of the burnished polysiloxane coated metal face should be to a temperature of at least approximately 150°C, and preferably to within the range of about 200°C to about 300°C. The period of heating may be relatively brief, for example about 10 minutes or more, depending, of course, upon the mass of the metal component being treated.

The following examples illustrate the conditions and merits of this invention.

One half of the surface of one side of several highly polished, hardened steel blocks, after being cleaned with mineral spirits and wiped dry, was coated with a thin layer of a water emulsion of 35% dimethyl polysiloxane fluid of 350 centistoke viscosity. The other half of the side of the blocks having had the coating applied to a half section thereof was left untreated to provide a control. The coated face of one of the blocks was briefly burnished with a hardwood block and the steel block was then heat treated in an oven for 10 minutes at 245°C and cooled. All test blocks were then placed in an oven for 10 minutes at 135°C to simulate actual extrusion temperature conditions and while at this temperature a strip of ethylene-vinyl acetate copolymer compound (Union Carbide's HFDA 0580) containing about 61% by weight of copolymer, about 37% carbon black, about 0.5% antioxidant (Flectol H, Monsanto), and about 1.5% dicumyl peroxide curing agent, was placed over the half coated test surface of each block and a two pound weight applied on top of the strip of copolymer to simulate extrusion pressures. After a ten minute period at 135°C, the thermoplastic copolymer strips were removed from the face of the metal blocks and their respective separation characteristic noted. The results were as follows:

| Silicone Agent | Burnishing | Heat Treatment | Results |
| --- | --- | --- | --- |
| None | None | None | Copolymer adheres to metal |
| Dimethyl polysiloxane | None | None | Copolymer adheres to metal |
| Dimethyl polysiloxane | Yes | 10 min. at 245°F | Copolymer releases cleanly from metal. | burnishing the metal face having thereon the dimethyl polysiloxane and heating the burnished metal face. Metals thus treated exhibit a durable and long lasting, slick sliding surface which resists adhesion thereto of moving hot thermoplastic materials.

The polysiloxane fluids for the practice of this invention include dimethyl polysiloxane and dimethyl diphenyl polysiloxane, and comprise such silicones of the lower viscosity grades such as 0.65 to 5000, and typically within the range of about 50 to 1000 centistokes. Suitable low viscosity polysiloxanes are commercially available in water emulsions or solvent solutions as well as siloxane fluids per se. The polysiloxane fluids can be applied to or coated on the surface of the metal face undergoing treatment by any convenient means, and In addition to the foregoing static testing, the treatment of this invention was evaluated under actual extrusion conditions. A steel extruder nipple, such as illustrated as 14 in the drawing, was cleaned with mineral spirits and the inner face or land of the guide orifice was saturated with a water emulsion of 35% dimethyl silicone fluid having a viscosity of 350 centistokes. Next the saturated face or land of the nipple orifice was burnished with a hardwood dowel and placed in an oven at 245°C for 25 minutes. After cooling, the silicone-treated guide nipple was assembled in an extrusion die head and the head installed on an extruder apparatus of a multilayer covered electrical cable production line and utilized in a tandem production operation as follows. A conductor having a covering thereon of a curable thermoplastic ethylene-vinyl acetate copolymer compound (Union Carbide's HFDA 0580) formed in a previous extruding operation, was continuously passed at a rate of approximately 4 feet per minute through the aforementioned treated guide tube assembled within the head of a second extruder wherein an insulating covering of curable thermoplastic polyethylene was extruded over the ethylene-vinyl acetate copolymer compound. A single treatment such as described above was found to enable continuous production runs of several thousand feet of cable without any evidence of the previously encountered interfacial irregularities or protrusions, and in turn without any failures of the cable in passing dielectric tests.

Although the invention has been described with reference to certain specific embodiments thereof, numerous modifications are possible and it is desired to cover all modifications falling within the spirit and scope of the invention. However, the invention is particularly directed to extrusion forming apparatus comprising any devices for continuously molding or shaping moving plastic materials, including die surfaces, guides, conduits leading to and from the shaping means, and extensions of the die or shaping means communicating with or passing through subsequent curing means such as heating devices.

What we claim as new and desire to secure by Letters Patent of the United States is:

1. A method of treating a metal face of an extrusion forming apparatus to provide thereon a durable, slick sliding surface, comprising applying polysiloxane fluid to the metal face, burnishing the metal face having the siloxane fluid thereon by vigorous rubbing of the polysiloxane fluid treated metal face with a material relatively softer than the metal face being treated, effectively over the entire surface treated, and heating the burnished metal face with the siloxane thereon to a temperature of at least about 150°C.

2. The method of claim 1, wherein the polysiloxane fluid is a dimethyl polysiloxane of a viscosity within the approximate range of 50 to 1000 centistokes.

3. The method of claim 2, wherein the burnished metal face with the polysiloxane thereon is heated to a temperature of about 200°C to 300°C.

4. The method of claim 1, wherein the polysiloxane is a dimethyl diphenyl polysiloxane.

5. A method of treating a metal face of an extrusion forming apparatus to provide thereon a durable, slick sliding surface, comprising applying polysiloxane fluid having a viscosity of from about 50 to about 1000 centistokes to a metal face of an extrusion forming apparatus, burnishing the metal face having the polysiloxane fluid thereon by vigorous rubbing of the polysiloxane fluid treated metal face with a material relatively softer than the metal face being treated effectively over the entire surface treated, and heating the burnished metal face with the polysiloxane thereon to a temperature of about 200°C to 300°C.

6. The method of claim 5, wherein the polysiloxane fluid is a dimethyl diphenyl siloxane.

7. The method of claim 5, wherein the polysiloxane fluid is dimethyl polysiloxane having a viscosity of about 100 to about 350 centistokes.

8. The method of claim 5, wherein the burnished metal face with the polysiloxane fluid thereon is heated to a temperature of approximately 250°C.

9. An extrusion forming apparatus having a metal face thereof provided with a durable, slick sliding surface comprising the product of applying a polysiloxane fluid to the metal face of the extrusion forming apparatus, burnishing the metal face having the polysiloxane fluid thereon by vigorous rubbing of the polysiloxane fluid treated metal face with a material relatively softer than the metal face being treated effectively over the entire surface treated, and heating the burnished metal face with the polysiloxane thereon to a temperature of at least about 150°C.

10. The extrusion forming apparatus of claim 9, wherein the polysiloxane fluid is of a viscosity within the approximate range of 50 to 1000 centistokes, and the burnished metal face with dimethyl polysiloxane thereon is heated to a temperature of about 200°C to about 300°C.

11. The extrusion forming apparatus of claim 9, wherein the polysiloxane is a dimethyl diphenyl polysiloxane.

12. An extrusion forming apparatus having a metal face thereof provided with a durable, slick sliding surface comprising the product of applying a dimethyl polysiloxane fluid having a viscosity of from about 100 to about 350 centistokes to the metal face of the extrusion forming apparatus, burnishing the metal face having the dimethyl polysiloxane fluid thereon by vigorous rubbing of the polysiloxane fluid treated metal face with a material relatively softer than the metal face being treated effectively over the entire surface treated, and heating the burnished metal face with the dimethyl polysiloxane thereon to a temperature of about 200°C to about 300°C.

* * * * *